United States Patent [19]
Khoe

[11] Patent Number: 4,708,426
[45] Date of Patent: Nov. 24, 1987

[54] ELECTRO-OPTICAL DEVICE COMPRISING A LASER DIODE, AND INPUT TRANSMISSION FIBRE AND AN OUTPUT TRANSMISSION FIBRE

[75] Inventor: Giok D. Khoe, Eindhoven, Netherlands

[73] Assignee: U.S. Philips Corp., New York, N.Y.

[21] Appl. No.: 751,416

[22] Filed: Jul. 2, 1985

[30] Foreign Application Priority Data

Jul. 9, 1984 [NL] Netherlands ............... 8402168
Dec. 24, 1984 [NL] Netherlands ............... 8403931

[51] Int. Cl.$^4$ .................. G02B 6/32; G02B 6/26
[52] U.S. Cl. ................. 350/96.18; 350/96.10; 350/96.15
[58] Field of Search ........... 350/96.15, 96.16, 96.17, 350/96.18, 96.20

[56] References Cited

U.S. PATENT DOCUMENTS

| | | | |
|---|---|---|---|
| 4,111,524 | 9/1978 | Tomlinson et al. | 350/96.16 X |
| 4,355,323 | 10/1982 | Kock | 357/74 |
| 4,370,021 | 1/1983 | Khoe et al. | 350/96.18 |
| 4,392,713 | 7/1983 | Ozeki | 350/96.16 |
| 4,431,261 | 2/1984 | Kozikowski | 350/96.20 |
| 4,502,753 | 3/1985 | Flocon | 350/96.16 |
| 4,543,666 | 9/1985 | Witte et al. | 350/96.16 X |

FOREIGN PATENT DOCUMENTS

| | | |
|---|---|---|
| 0073300 | 3/1983 | European Pat. Off. ......... 350/96.18 |
| 0081349 | 6/1983 | European Pat. Off. . |
| 0114439 | 8/1984 | European Pat. Off. . |

OTHER PUBLICATIONS

"Optical Grating Multiplexer in the Wavelength Region", by Watanabe et al., Electronic Letters 31st Jan., vol. 16, No. 3.

"Microlenses to Improve LED-to-Fiber Optical Coupling & Alignment Tolerance", by Ackenhusen, Applied Optics/vol. 18, No. 21/1 Nov. 1979.

"An Experimental Low-Loss Single-Wavelength Bidirectional Lightwave Link", by Ponock et al., IEEE Journal of Lightwave technology, vol. LT-2, No. 3, Jun. 1984.

Okoshi, T. "Heterodyne and Coherent Optical Fiber Communications . . . ", IEEE Trans. Microwave Th. and Tech., vol. MTT-30, No. 8, Aug. 1982, pp. 1138-1149.

Mukai, T. et al., "S/N and Error Rate . . . ", IEEE J. Quantum Elec., vol. QE-18, No. 10, pp. 1560-1568 (Oct. 1982).

Kobayashi, S. et al., "Optical Phase Modulation . . . ", IEEE J. Quant. Elec., vol. QE-18, No. 10, pp. 1662-1669 (Oct. 1982).

Iwashita, K., et al., "Suppression of Mode Portion . . . ", IEEE J. Quant. Elec., vol. QE-18, No. 10, pp. 1669-1674 (Oct. 1982).

Ikeda, M. "Switching Characteristics . . . ", IEEE J. Quant. Elec., vol QE-19, No. 2, pp. 157-164 (Feb. 1983).

Otsuka, K. et al., "Analysis of . . . ", IEEE J. Quant. Elec., vol. QE-19, No. 7, pp. 1184-1186 (Jul. 1983).

Saito, S., et al., "Oscillation Center Frequency . . . ", IEEE J. Quantum Electronics, vol. QE-18, No. 6, pp. 961-970 (Jun. 1982).

Primary Examiner—William L. Sikes
Assistant Examiner—Akm E. Ullah
Attorney, Agent, or Firm—Marc D. Schechter

[57] ABSTRACT

An electrooptical device comprises a semiconductor laser to which a plurality of optical transmission fibers are coupled. An input transmission fiber and at least one output transmission fiber are combined to form a tapered common fiber end portion. The common end portion has a transverse dimension on the order of that of a single transmission fiber. By coupling this end portion to one radiation-emitting surface of the semiconductor laser, a standard laser package may be employed and several new uses become feasible in practice.

4 Claims, 18 Drawing Figures

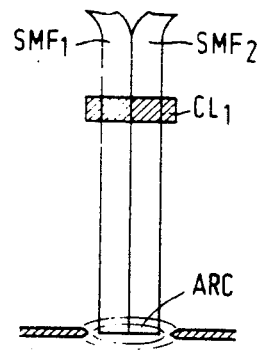
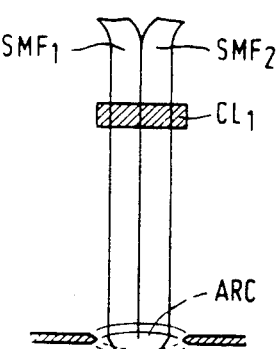
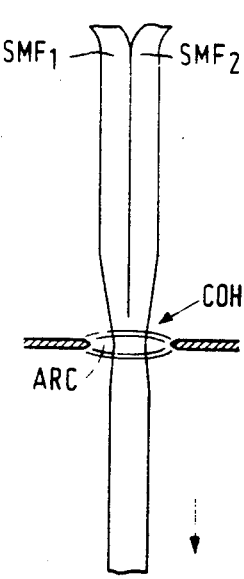
FIG. 4a  FIG. 4b  FIG. 4c
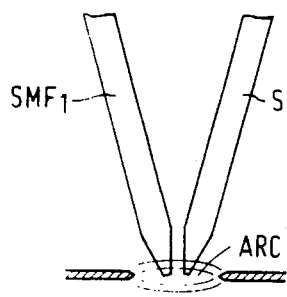
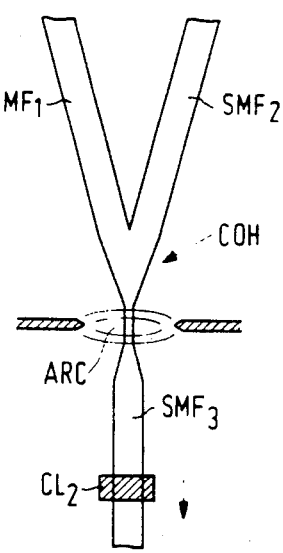
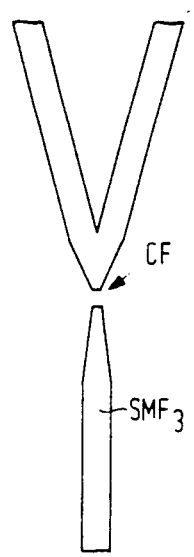
FIG. 5a  FIG. 5b  FIG. 5e

ELECTRO-OPTICAL DEVICE COMPRISING A LASER DIODE, AND INPUT TRANSMISSION FIBRE AND AN OUTPUT TRANSMISSION FIBRE

BACKGROUND OF THE INVENTION

The invention relates to an electrooptical device comprising a semiconductor laser. A first radiation path, which terminates at the semiconductor laser, applies an optical signal to the laser. The optical signal influences a parameter of the laser radiation. A second radiation path, which also terminates at the semiconductor laser, provides the laser radiation output.

The parameter to be influenced may be the intensity, the wavelength, or the phase of the semiconductor laser radiation.

Such a device is described, for example, in an article by S. Kobayashi et al entitled "Optical Phase Modulation in an Injection Locked AlGaAs Semiconductor Laser" (*IEEE Journal of Quantum Electronics*, Vol. QE-18, No. 10, pages 1662-1669, October 1982). The electrooptical device described therein forms part of a so-called coherent optical transmission system which shows great promise for the future because of its large data handling capacity and the large distance between repeater stations.

The described electrooptical device performs optical phase modulation by injecting a coherent radiation beam, originating from, for example, a first diode laser, into a second diode laser which is directly frequency modulated. In practice, this means that in addition to an output transmission fiber, an input transmission fiber, which transmits the radiation from the first diode laser to the second diode laser, must be coupled to the second diode laser of this device.

Apart from being used as a radiation source which is influenced by an injected beam (an injection locked source), a semiconductor laser may be used for various other purposes in coherent optical transmission systems and in other special applications. For example, the laser may be used as a radiation amplifier, an external modulator, a semiconductor laser switch, an active optical starpoint, and a radiation source with external feedback. For these uses, which have been described in the literature, a diode laser must be coupled to an input transmission fiber and at least one output transmission fiber. It has been proposed to couple the transmission fibers to two opposite radiation-emitting surfaces of the semiconductor laser, hereinafter referred to as the front and the rear of the laser. In practice, these fibers must be single mode glass fibers.

As is known, it is very difficult to couple a single mode transmission fiber to the front of a semiconductor laser with the desired coupling efficiency. Coupling a second single mode transmission fiber to the rear of the semiconductor laser will pose even greater practical problems because (i) this requires the use of a special cooling block for the laser, (ii) twice as many critical alignment steps must be carried out, (iii) the package for the semiconductor laser must be redesigned, and (iv) this package should comprise two fiber seals or two window/lens combinations instead of one.

Moreover, it becomes almost impossible to arrange a detector, for monitoring the laser radiation, inside the package. Further, only two single mode transmission fibers can be coupled to a semiconductor laser.

SUMMARY OF THE INVENTION

It is an object of the present invention aims to provide an electrooptical device which couples two fibers to a semiconductor laser, but with only one laser-fiber junction. In the device according to the invention, the radiation paths comprise single mode transmission fibers. The single mode input transmission fiber and at least one single mode output transmission fiber are coupled to the same radiation-emitting surface of the semiconductor laser. The transmission fiber ends which face this surface constitute a composite fiber with a tapered end portion. The end face of the composite transmission fiber has been provided with a transparent material with a spherical surface.

In a first embodiment of the electrooptical device, the spherical body on the end face of the transmission fiber has a refractive index which is substantially higher than that of the transmission fiber core. In this way, the combination of fiber end and spherical body or lens has a high numerical aperture, and consequently a high coupling efficiency.

In a second embodiment of the electrooptical device, the spherical body on the end face of the transmission fiber has a melting temperature which is lower than that of the transmission fiber, and has a refractive index which is substantially equal to that of the fiber core. In this embodiment, the likelihood of radiation being reflected back to the diode laser from the lens-fiber interface is minimized. Despite the lower refractive index of the lens, a sufficiently high coupling efficiency is obtained.

The invention is based on the fact, which until now has not been utilized in the field of optical transmission fibers, that a semiconductor laser is symmetrical and in fact does not have a front or rear. One of these surfaces (the front) may be used as the input face for receiving an optical drive signal and also as an output face from which the laser radiation emerges. If the ends of the transmission fibers to be coupled to the semiconducotr laser are combined to form a composite fiber end with cross-sectional dimensions on the order of the dimensions of the end of one single mode transmission fiber, existing coupling techniques may be employed. The semiconductor laser packages can then be substantially identical to the customary packages.

It is to be noted that U.S. Pat. No. 4,431,261 describes an electrooptical device in which a plurality of transmission fibers terminate in one composite fiber which is coupled to a radiation source such as a light emitting diode (LED). However, in that device all the transmission fibers are output fibers. None of the transmission fibers are used for driving or controlling the radiation source. Further, these transmission fibers are not single mode fibers, and the radiation source is not a semiconductor laser.

U.S. Pat. No. 4,431,261 and European Patent Application No. 0,081,349 describe tapering the common end portion of a plurality of transmission fibers. Until now, however, this has not been applied to an assembly of a single mode input transmission fiber and at least one single mode output transmission fiber. Further, in the electrooptical devices described in these two publications, the end face of the composite transmission fiber has not been provided with a spherical transparent body. In the device according to the invention, this spherical body functions as a lens which provides an improved coupling efficiency and which allows larger displacement of the transmission fiber relative to the semiconductor laser.

The coupling efficiency is to be understood to mean the quotient of the semiconducotr laser radiation intensity received by the transmission fiber divided by the total radiation intensity of the laser.

Forming a plurality of fibers with a common end portion has the additional advantage that all of the fibers can be aligned in one operation, and that the distribution of the radiation energy among the various fibers can be adjusted simply.

BRIEF DESCRIPTION OF THE DRAWING

FIGS. 3a–3f, 4a–4c, and 5a–5c schematically illustrate different methods of obtaining a composite tapered transmission fiber end portion.

DESCRIPTION OF THE PREFERRED EMBODIMENTS

Figure 1A:
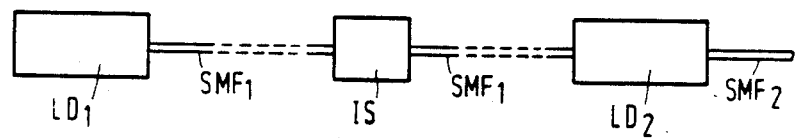
FIGS. 1a and 1b schematically show parts of a coherent optical transmission system.

FIG. 1a schematically shows a part of a coherent optical transmission system. For details of coherent optical transmission systems reference is made to an article by T. Okoshi entitled "Heterodyne and Coherent Optical Fiber Communications: Recent Progress" (*IEEE transactions on Microwave Theory and Techniques*, Vol. MTT-30, No. 8, pages 1138–1149, August 1982).

In FIGS. 1a the references $LD_1$ and $LD_2$ denote first and second semiconductor lasers, for example diode lasers, which are also referred to as a master laser and a slave laser, respectively. Via a single mode transmission fiber $SMF_1$, the beam emitted by the diode laser $LD_1$ is transmitted to the second diode laser $LD_2$. The phase of the beam emitted by the diode laser $LD_2$ and output via the single mode transmission fiber $SMF_2$ depends on the beam which originates from $LD_1$ and which is injected into the diode laser $LD_2$. An isolater IS arranged between the two diode lasers ensures that the beam emitted from the rear of $LD_2$ cannot enter the diode laser $LD_1$ and thus influence the beam emitted by $LD_1$.

Figure 1B:
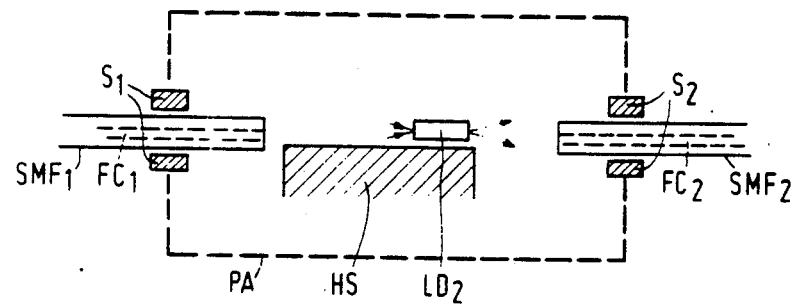

FIG. 1b shows the device construction around the diode laser $LD_2$ in more detail. The diode laser $LD_2$ is arranged on a heat sink HS inside a package PA. The output transmission fiber $SMF_2$ with the fiber core $FC_2$ extends into the package PA via a seal $S_2$.

The beam from the diode laser $LD_1$ must be coupled into the diode laser $LD_2$. If, as shown in FIG. 1a, the end of the transmission fiber $SMF_1$ with the fiber core $FC_1$ is positioned against the rear of the diode laser $LD_2$, the following problems will arise.

First, it is now necessary to use a special heat sink whose length is equal to that of the diode laser. Without such a heat sink, the transmission fiber $SMF_1$ cannot be arranged close enough to the rear of the diode laser and cannot be aligned correctly relative to the diode laser $LD_2$. Moreover, the coupling between the transmission fiber $SMF_1$ and the diode laser $LD_2$ may be disturbed by reflections from the surface of the heat sink. An efficient and stable coupling will then be nearly impossible.

Second, during assembly of the device twice as many critical alignment steps are required. Each single mode transmission fiber must be aligned separately relative to the diode laser $LD_2$.

Third, it is necessary to employ a new package. This package should comprise stable means for fixing the two aligned transmission fibers on both sides of the diode laser $LD_2$.

Fourth, instead of one seal $S_2$ or one window/lens, two such seals ($S_1$ and $S_2$) or two window lenses are required. A window/lens couples a transmission fiber whose end is located outside of the package to be optically coupled to the diode laser.

Fifth, in many cases it may be necessary to measure the intensity of the radiation emitted by the diode laser. Often this is achieved by a radiation-sensitive diode which is situated outside the package at the rear of the diode laser. This is no longer possible if the transmission fiber $SMF_1$ has been coupled to the rear of the diode laser.

Finally, it is not possible to couple more than two single mode transmission fibers to the diode laser.

Figure 2:
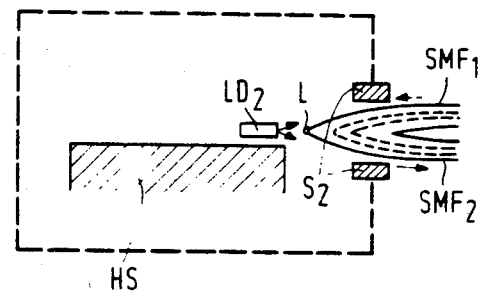
FIG. 2 schematically shows a part of such a system using the device according to the invention.

All of the aforementioned problems are avoided if, as is proposed by the invention and as is shown in FIG. 2, the ends of two or more single mode transmission fibers are fused together, the fused ends are drawn down to a diameter on the order of the diameter of a single transmission fiber, and the composite transmission fiber is coupled to the front of the diode laser. A standard or slightly modified diode laser package may then be used.

The end face of the composite transmission fiber is provided with a lens whose refractive index may be higher than the refractive index of the fiber core. Such a lens, bearing the reference L in FIG. 2, increases the coupling efficiency and reduces the required alignment accuracy.

Figure 3A:
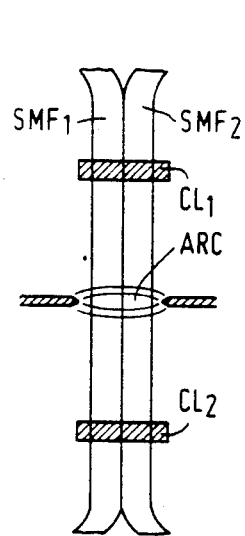

The composite transmission fiber end can be obtained using the method illustrated by FIGS. 3a–3f. In this method, two transmission fibers are clamped together with clamps CL and are heated, for example by an arc discharge ARC, as indicated in FIG. 3a. As a result, the transmission fibers are fused together, forming one composite fiber.

Figure 3B:
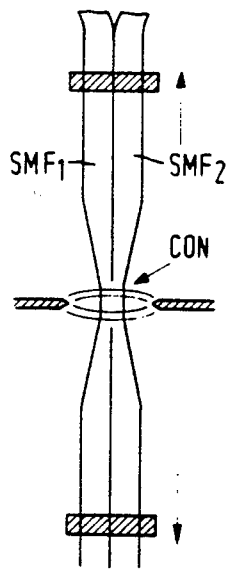
Figure 3C:
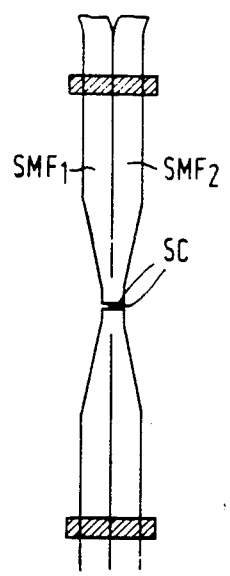

As shown in FIG. 3b, the fused fibers are drawn while maintaining the arc discharge so that at the location of the arc discharge a narrow constriction CON is formed. After the arc discharge has been switched off the composite fiber is fractured, as shown schematically in FIG. 3c. For this purpose the constriction may be scored at SC by a scribing tool. Then the transmission fiber is subjected to a tensile force until it parts along a flat fracture surface.

Figure 3D:
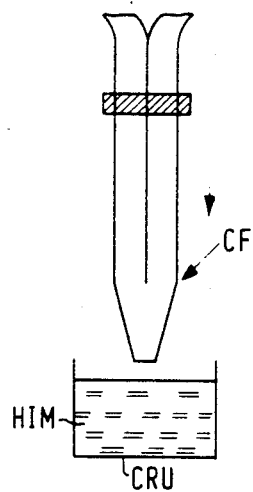
Figure 3E:
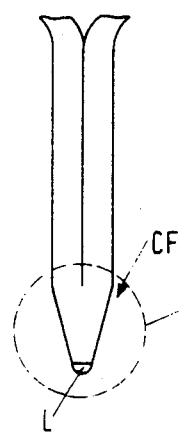

As shown in FIG. 3d, the composite tapered transmission fiber CF thus obtained is dipped in a liquid or viscous material HIM in a crucible CRU. This material has a refractive index which is, for example, higher than that of the fiber core material. When the fiber end is withdrawn from the crucible a portion of the material HIM will adhere to the fiber by a surface tension. This material will take on a chosen shape when it has a chosen viscosity. The dimensions and the shape of this drop can be influenced by the immersion depth and the temperature of the material in the crucible. Further, the shape of the fiber end also determines the shape of the drop. After the fiber end with the drop has been withdrawn from the crucible, the drop, if it is made of glass, is allowed to cool. In this way a lens L is formed on the fiber end, as shown in FIG. 3e.

Figure 3F:
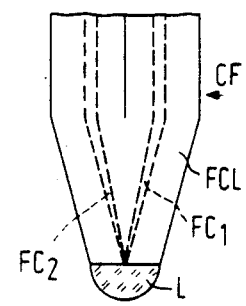

FIG. 3f is an enlarged view of the fiber end with the lens L. Both the cladding FCLL and the fiber cores $FC_1$ and $FC_2$ are tapered.

Alternatively, the ends of the two single mode transmission fibers may be fused together, and then a third transmission fiber $SMF_3$ may be fused to the composite transmission fiber, as shown in FIGS. 4a and 4b. Subsequently, the composite fiber is drawn until a narrow constriction CON is formed, as shown in FIG. 4c. After fracture in the manner illustrated in FIG. 3c, the upper portion of the composite fiber may be treated in a manner similar to that described with reference to FIGS. 3d and 3e.

Another method of obtaining the desired composite transmission fiber is illustrated in FIGS. 5a–5c. The method starts with two single mode transmission fibers which already have tapered end portions. These tapered end portions are fused together, as shown in FIG. 5a. Subsequently, a third transmission fiber is fused to this assembly and the resulting composite transmission fiber is drawn until a narrow constriction CON is formed, as shown in FIG. 5b. Now, the fiber is fractured substantially at the narrowest constriction, as shown in FIG. 5c. Finally, the upper composite fiber portion is provided with a lens in the same manner described with reference to FIGS. 3d and 3e.

The lens may have a refractive index which is higher than that of the fiber core, so that the combination of the fiber core andthe lens has a numerical aperture which is larger than that of the fiber end alone. This results in a higher coupling efficiency.

The lens can also be formed by immersing the fiber end in a material whose melting temperature is lower than that of the fiber core or fiber cladding, so that the fiber parameters are not changed as a result of immersion. The lens material may have a refractive index substantially equal to that of the core material. In this embodiment, reflections from the lens-fiber interface and the resulting feedback of radiation to the diode laser are avoided. The coupling efficiency is high in spite of the lower refractive index of the lens material.

Figure 6:
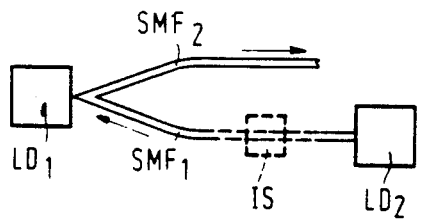
FIGS. 6–8 schematically illustrate various uses of an electrooptical device according to the invention.

FIG. 6 illustrates a first use of the invention. The input transmission fiber $SMF_1$ of a semiconductor laser, such as a diode laser $LD_2$, is connected to a second diode laser $LD_1$. Between the two diode lasers an isolator IS is arranged. The basic arrangement shown in FIG. 6 can perform various functions.

1. As stated in the aforementioned article by S. Kobayashi et al, the phase of the beam emitted by the diode laser $LD_1$ can be modulated by the arrangement of FIG. 6. This operation of the device may be used in a coherent optical transmission system.

2. Alternatively, the arrangement shown in FIG. 6 may be used as a diode laser switch. In that case, the wavelength of the beam produced by the diode laser $LD_1$ is substantially equal to the wavelength for which the laser action can be obtained in the diode laser $LD_2$. A large difference between the intensities of the beams emitted by the diode laser $LD_2$ in the "on" and "off" state of this laser is obtained by injecting an optical signal from laser $LD_2$ into the diode laser $LD_1$. The injected signal is absorbed by $LD_1$ when $LD_2$ is off, and is amplified by $LD_1$ when $LD_2$ is on. For further details of such a diode laser switch reference is made to the article by M. Ikeda entitled "Switching Characteristics of a Laser Diode Switch" (*IEEE Journal of Quantum Electronics*, Vol. QE-19, No. 2, pages 157–164, February 1983).

3. The FIG. 6 device may be a diode laser amplifier. Such an amplifier may be used, for example, in a repeater station in an optical communication network for amplifying a beam which has been emitted and modulated by a diode laser $LD_1$ and which has traversed a substantial path length. The behavior of a diode laser amplifier is described in an article by T. Mukai et al entitled "S/N and Error Rate Performace in AlGaAs Semiconductor Laser Preamplifier and Linear Repeater Systems" (*IEEE Journal of Quantum Electronics*, Vol. QE-18, No. 10, pages 1560–1568, October 1982).

4. An article by K. Otsuka et al entitled "Analysis of a Multistable Semiconductor Light Amplifier" (*IEEE Journal of Quantum Electronics*, Vol. QE-19, No. 7 pages 1184–1186, July 1983) describes a bistable diode laser. The diode laser is operated with a direct current smaller than the threshold current for laser action. A laser beam is injected into the diode laser. Such an bistable optical element can be used as a storage element or as an optical "logic circuit". Such an optical bistable element may be constructed as shown in FIG. 6.

5. Mode partition noise in a diode laser operated at high frequency, for example a frequency higher than 100 Mbits/second, can be suppressed by injecting a beam into the diode laser. The injected beam is produced by another diode laser which is operated with a direct current. This technique is described in the article by K. Iwashita entitled "Suppression of Mode Partition Noise by Laser Diode Light Injection" (*IEEE Journal of Quantum Electronics*, Vol. QE-18, No. 10, pages 1669–1674, October 1982). The radiation beam can be injected into the diode laser via a single mode transmission fiber $SMF_1$ which is coupled to the front of a direct current diode laser, as shown in FIG. 6.

Figure 7:
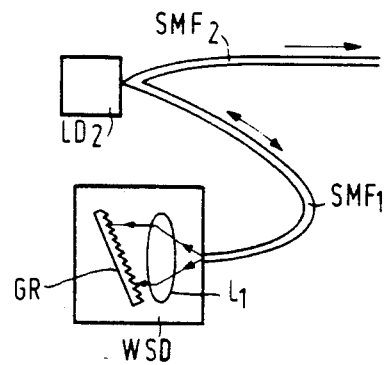
Figure 8:
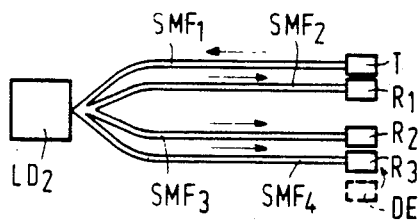

It is to be noted that FIGS. 6–8 show only the diode lasers without their packages. In principle, the packages, including that of diode laser $LD_2$, may be of a conventional type and may be constructed, for example, as described in U.S. Pat. No. 4,355,323.

In the arrangement shown in FIG. 7, the input transmission fiber $SMF_1$ is coupled to a wavelength-sensitive devise WSD. This device may be an integrated optical device comprising a lens $L_1$ which collimates the incoming beam and a reflection grating GR. The grating GR only reflects radiation of a specific wavelength into the aperture of the input transmission fiber $SMF_1$. This wavelength is injected into the diode laser $LD_2$.

Such a device substantially reduces the bandwidth of the radiation spectrum emitted by the diode laser with respect to the spectrum which would be emitted by the diode laser if it were not coupled to the wavelength-sensitive element. The principle of the bandwidth reduction is described in an article by S. Saito et al entitled "Oscillation Center Frequency Tuning Quantum FM Noise, and Direct Frequency Modulation Characteristics in External Grating Loaded Semiconductor Lasers" (*IEEE Journal of Quantum Electronics*, Vol. QE-18, No. 6, pages 961–970, June 1982).

As shown in FIG. 8, more than two single mode transmission fibers may be coupled to the front of the diode laser $LD_2$. One of these fibers, $SMF_1$, is coupled to a transmitter T. The signal which is transferred via this transmission fiber is amplified in the diode laser $LD_2$. The amplified signal is distributed among the output transmission fibers $SMF_2$, and $SMF_4$. The output fibers are coupled to receivers $R_1$, $R_2$, and $R_3$. The transmitter T and the receivers $R_1$, $R_2$ and $R_3$ may be replaced by devices which can operate both as transmitters and receivers, so that all the transmission fibers can function both as input transmission fibers and as output transmission fibers. At any instant one of the transmission fibers is always the input fiber and the other transmission fibers are the output fibers. In this way an active star point is obtained which is suitable for use in a local optical transmission network.

For monitoring the radiation emitted by the diode laser it is alternatively possible to use one of the output transmission fibers of the device shown in FIG. 8 or an additional output transmission fiber in the devices shown in FIGS. 6 or 7. For this purpose, this transmission fiber is coupled to a radiation-sensitive detector DE. Detector DE may be a photodiode. The output signal of the photodiode depends, inter alia, on variations in the coupling between the diode laser and the transmission fiber. By sensing a measurement signal which is branched from the front of the laser diode, the influence of temperature on the diode laser package can be eliminated in a very reliable manner.

What is claimed is:

1. An electrooptical device comprising:
   a semiconductor laser having a radiation-emitting surface;
   at least two single mode optical transmission fibers having first and second ends, said first ends being coupled to the radiation-emitting surface of the laser, said first ends forming a tapered composite fiber with a composite end face;
   a transparent material provided on the composite end face, said transparent material having a spherical surface;
   an optical source coupled to the second end of one fiber; and
   an optical receiver coupled to the second end of the other fiber.

2. An electrooptical device as claimed in claim 1, characterized in that the composite end face has a cross-section whose dimensions are on the order of magnitude of the dimensions of the cross-section of a single mode optical transmission fiber.

3. An electrooptical device as claimed in claim 1, characterized in that:
   the composite fiber has cores with refractive indices; and
   the transparent material has a refractive index which is substantially higher than the refractive indices of the cores of the composite fiber.

4. An electrooptical device as claimed in claim 1, characterized in that:
   the composite fiber has cores with refractive indices;
   the composite fiber has a melting temperature; and
   the transparent material has a melting temperature lower than that of the composite fiber, and has a refractive index substantially equal to the refractive indices of the cores of the composite fiber.

* * * * *